S. CROFT.
APPARATUS FOR MAKING CONFECTIONERY.
No. 176,775.            Patented May 2, 1876.
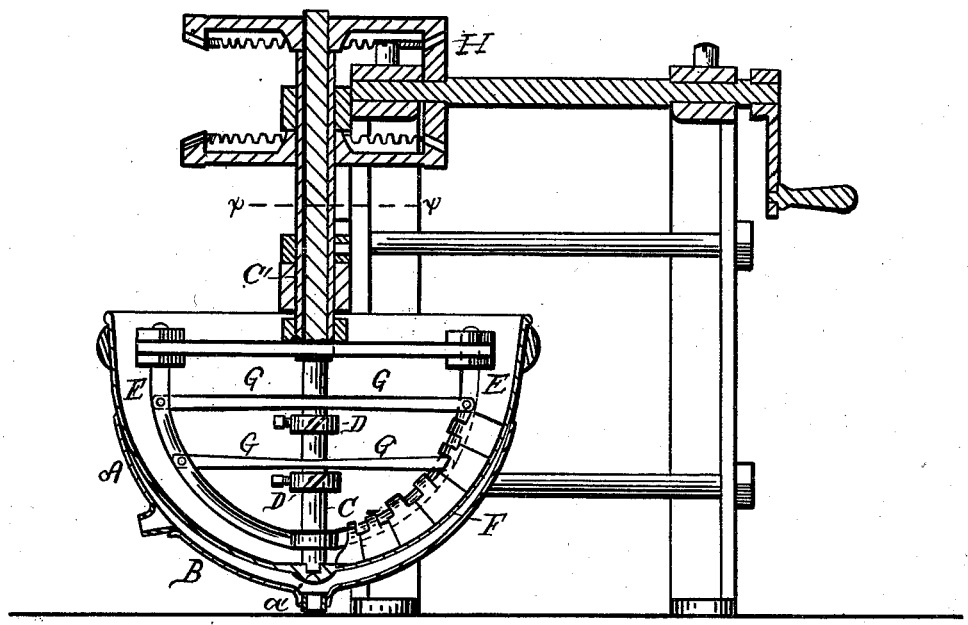
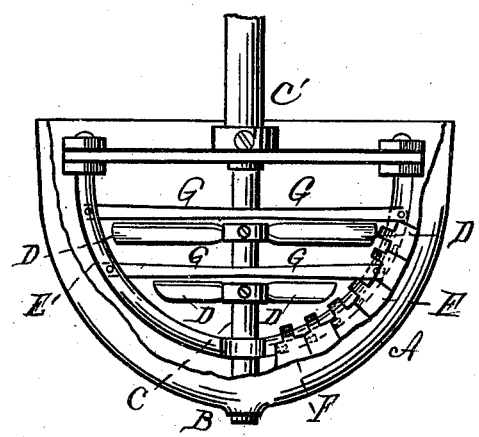
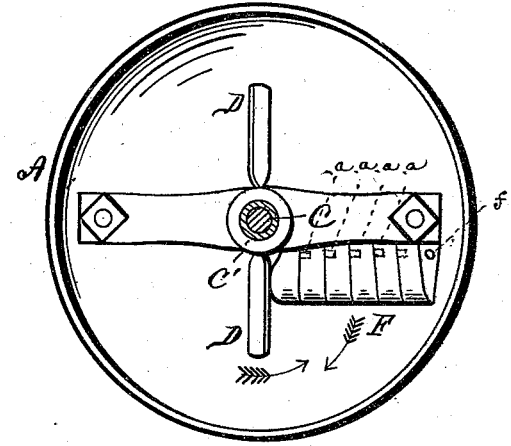
Witnesses:
Ben: H. Hunt.
Lewis T. Brous
Inventor:
Samuel Croft
by John A. Wiedersheim
Atty.

UNITED STATES PATENT OFFICE.

SAMUEL CROFT, OF PHILADELPHIA, PENNSYLVANIA.

IMPROVEMENT IN APPARATUS FOR MAKING CONFECTIONERY.

Specification forming part of Letters Patent No. 176,775, dated May 2, 1876; application filed August 13, 1875.

*To all whom it may concern:*

Be it known that I, SAMUEL CROFT, of the city and county of Philadelphia and State of Pennsylvania, have invented a new and useful Improvement in Confectioners' Apparatus for Cooking, Stirring, Beating, &c.; and I do hereby declare the following to be a clear and exact description of the nature thereof, sufficient to enable others skilled in the art to which my invention appertains, to fully understand, make, and use the same, reference being had to the accompanying drawings, making part of this specification, in which—

Figure 1 is a view, partly side and sectional, of the apparatus embodying my invention. Fig. 2 is a view of the interior of the pan or vessel. Fig. 3 is a top view below the sectional line $x\,x$, Fig. 1.

Similar letters of reference indicate corresponding parts in the several figures.

My invention consists of a pan having a concave or rounded bottom, and rotating vanes, in combination with an arch shaped yoke connected to certain of the vanes, and carrying a scraping-blade, which, formed in sections, curves to conform to the curvature of the bottom of the pan, whereby the confectioners' composition which is being cooked, stirred, beat, or otherwise treated, will be prevented from burning or sticking, and the vanes and scrapers will be prevented from being twisted or broken off, and they adjust themselves to the curvature of the bottom of the pan regardless of strain thereon, or irregularities in the thickness or resistance of the composition.

Referring to the drawings, A represents a confectioners' pan or vessel, which has a rounded bottom, B, and is suspended from or rested on suitable supports in any wellknown manner, the pan being adapted to be heated by steam or otherwise, as desired. C represents a shaft, whose lower end rests on a step, $a$, on the bottom of the pan A, and to said shaft are connected vanes or beaters D, which project from opposite sides of the shaft, and are inclined transversely. A tubular shaft, C', incloses the shaft C, and to said shaft C' there is connected a yoke, E, which is located within the pan A, and constructed of curved shape to conform to the curved bottom of the pan. To one side of the yoke E there is connected a blade, F, which is made in sections, and the outer or forward edge of the blade is of curved form to correspond to the curved form of the bottom of the pan, and the blade is set at an inclination to the inner face of the pan A, the radius of the curve of the blade F being the same as that of the curved inner face of the pan A, so that the outer edge of the blade and inner face of the pan are coincident. It is evident that the other side of the yoke may carry a blade similar to the blade F. In order to hold the sections of the blade F in proper position on the arched yoke, and permit them to conform to the curved bottom of the pan, and adjust themselves to any inequalities or thickness of material in the pan, the sections are loosely connected by pins $a$, each of which connected to one section enters an opening, $f$, in the adjacent section. To the yoke E there are connected vanes or beaters G, which extend from one side of the yoke toward or to the other, and are arranged above and below the vanes or beaters D, so that the two sets of vanes or beaters pass between each other.

The shafts C C' receive rotation in opposite directions by means of the gearing H, or other suitable driving mechanism, and it will be seen that the blade or blades F, and the set of vanes or beaters G rotate in one direction, and the vanes or beaters D rotate in the opposite or reverse direction. The blade F scrapes and lifts the composition from the bottom of the pan. The beaters or vanes D, owing to their shape, lift or raise the composition in the pan or vessel A, and at the same time carry said composition in one direction, which is counteracted by the tendency of the beaters or vanes G to carry it around in the opposite direction, and the composition, having upward, downward, and circular motions in opposite directions, will be constantly agitated, so that it will be thoroughly incorporated, stirred, beat, or otherwise treated, and prevented from burning, sticking, &c.

I am aware that stirrers and beaters for eggs, &c., have been formed with concave bottoms, and with yokes and vanes, and I therefore disclaim such features.

Having thus described my invention, what I claim as new, and desire to secure by Letters Patent, is—

The arched yoke E, in combination with the blade F fitted thereon, and formed in sections loosely connected by pins $a$, substantially as and for the purpose set forth.

<div style="text-align:right">SAMUEL CROFT.</div>

Witnesses:
   JOHN A. WIEDERSHEIM,
   JNO. D. PATTEN.